US009255860B2

(12) United States Patent
Lamberton et al.

(10) Patent No.: US 9,255,860 B2
(45) Date of Patent: Feb. 9, 2016

(54) IMMERSION INSPECTION SYSTEM FOR A MACHINE AND RELATED METHOD OF OPERATION

(71) Applicant: General Electric Company, Schenectady, NY (US)

(72) Inventors: Gary Austin Lamberton, Glenville, NY (US); Curtis Wayne Rose, Mechanicville, NY (US)

(73) Assignee: General Electric Company, Schenectady, NY (US)

( * ) Notice: Subject to any disclaimer, the term of this patent is extended or adjusted under 35 U.S.C. 154(b) by 355 days.

(21) Appl. No.: 13/792,609

(22) Filed: Mar. 11, 2013

(65) Prior Publication Data

US 2014/0250982 A1    Sep. 11, 2014

(51) Int. Cl.
    *G01M 3/02*    (2006.01)
    *G01M 5/00*    (2006.01)
    *G01M 3/00*    (2006.01)
    *F22B 37/00*   (2006.01)
    *F01D 21/00*   (2006.01)

(52) U.S. Cl.
    CPC ........... *G01M 5/0025* (2013.01); *F22B 37/003* (2013.01); *G01M 3/005* (2013.01); *G01M 5/0033* (2013.01); *G01M 5/0066* (2013.01); *G01M 5/0075* (2013.01); *F01D 21/003* (2013.01); *F05D 2260/80* (2013.01)

(58) Field of Classification Search
    None
    See application file for complete search history.

(56) References Cited

U.S. PATENT DOCUMENTS

| 4,593,568 | A | 6/1986 | Telford et al. |
| 5,062,300 | A | 11/1991 | Vallee |
| 6,487,922 | B1 * | 12/2002 | Bauer et al. .................. 73/865.8 |
| 6,571,634 | B1 | 6/2003 | Bazarov et al. |
| 6,619,109 | B1 | 9/2003 | Dailey et al. |
| 6,651,503 | B2 | 11/2003 | Bazarov et al. |
| 6,684,706 | B2 * | 2/2004 | Knight et al. ................... 73/623 |
| 6,772,637 | B2 | 8/2004 | Bazarov et al. |

OTHER PUBLICATIONS

European Patent Office, Extended European Search Report for EP Application No. 14157570.4 / Patent No. EP2801699 dated Jun. 29, 2015, 6 pages.

* cited by examiner

*Primary Examiner* — Hezron E Williams
*Assistant Examiner* — Mark A Shabman
(74) *Attorney, Agent, or Firm* — Ernest G. Cusick; Hoffman Warnick LLC

(57) ABSTRACT

Systems, devices, and methods, adapted to immersively test/inspect machine components (e.g., tubes, conduits, etc.) in an in-situ manner are disclosed. In one embodiment, a system includes: a first seal member configured to sealingly engage a first portion of a machine component; a base system connected to the first seal member and configured to extend within the machine component, the base system including: a housing; and a inspection device disposed within the housing and configured to inspect the machine component; and a second seal member connected to the base system and configured to sealingly engage a second portion of the machine component.

14 Claims, 9 Drawing Sheets

IMMERSION INSPECTION SYSTEM FOR A MACHINE AND RELATED METHOD OF OPERATION

FIELD OF THE INVENTION

The subject matter disclosed herein relates to machines and, more particularly, to a system and method for immersive in-situ testing (e.g., inspection) of tube and tube joint integrity in machines, particularly turbines, generators, and heat exchangers.

BACKGROUND OF THE INVENTION

Some power plant systems, for example certain nuclear, simple-cycle and combined-cycle power plant systems, employ machines (e.g., turbines, generators, etc.) in their design and operation. These machines include conduits (e.g., tubes, pipes, etc.) which may circulate fluids for use and distribution by power plant systems and machines. These conduits may be integrated throughout the machine and connected to a number of machine components (e.g., a tube sheet, a plenum, an assembly, etc.) via a joint (e.g., a weld, a braze, etc.) between the conduit and the machine component. The structural integrity of these tubes and joints may be integral to plant safety, efficiency, and durability, as failures and/or leaks may damage and/or destroy machine components. Some power plant systems visually inspect joints between these tubes and machine components, relying on technician eyesight and experience to inspect and insure the quality of these features (e.g., to detect defects in the braze/weld, to detect a flaw, to assess bond line integrity, to identify joining defects, etc.). Alternatively, some power plant systems inspect these joints and conduits through radiography, penetrant checks, and/or pressurized leak checks. However, these systems may be imprecise, time consuming (e.g., requiring machine disassembly) and susceptible to human error; failing to provide an accurate, reviewable record of defects. These systems may include the use of large amounts of couplant (e.g., free flowing water) which may not be ideal for in-situ inspection of some machines and/or processes (e.g., inspection of a combustion component of a gas turbine). Further, these systems may require significant power plant system disassembly and inspection outages, and may not provide a full analysis of conduit and/or joint surfaces/integrity.

BRIEF DESCRIPTION OF THE INVENTION

Systems and methods for in-situ immersive inspection of machine components are disclosed. In one embodiment, a system includes: a first seal member configured to sealingly engage a first portion of a machine component; a base system connected to the first seal member and configured to extend within the machine component, the base system including: a housing; and an inspection device disposed within the housing and configured to inspect the machine component; and a second seal member connected to the base system and configured to sealingly engage a second portion of the machine component.

A first aspect of the disclosure provides a system that includes: a first seal member configured to sealingly engage a first portion of a machine component; a base system connected to the first seal member and configured to extend within the machine component, the base system including: a housing; and an inspection device disposed within the housing and configured to inspect the machine component; and a second seal member connected to the base system and configured to sealingly engage a second portion of the machine component.

A second aspect provides an inspection system including: a first seal member configured to sealingly engage a first portion of a machine component; a second seal member disposed proximate the first seal member and configured to sealingly engage a second portion of the machine component, the first seal member and the second seal member substantially fluidly isolating an inspection portion of the machine component; a housing connected to the first seal member and configured to extend within the inspection portion of the machine component; and a couplant feed system connected to the housing and configured to inject couplant into the inspection portion of the machine component.

A third aspect provides a method including: inserting a immersion inspection system into a conduit; connecting a first seal member and a second seal member to an interior surface of the conduit, the first seal member and the second seal member substantially fluidly isolating an inspection portion of the conduit; inserting a couplant in to the inspection portion of the conduit; and performing a scan of a section of the conduit within the inspection portion via an inspection device disposed between the first seal member and the second seal member.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not necessarily to scale. The drawings are intended to depict only typical aspects of the invention, and therefore should not be considered as limiting the scope of the invention. It is understood that elements similarly numbered between the FIGURES may be substantially similar as described with reference to one another. Further, in embodiments shown and described with reference to FIGS. 1-9, like numbering may represent like elements. Redundant explanation of these elements has been omitted for clarity. Finally, it is understood that the components of FIGS. 1-9 and their accompanying descriptions may be applied to any embodiment described herein.

DETAILED DESCRIPTION OF THE INVENTION

As indicated herein, aspects of the invention provide for systems, devices, and methods, adapted to immersively test/inspect machine components (e.g., turbines, generators, heat exchangers, turbine nozzles, tubes, conduits, etc.) in an in-situ manner. These systems include a first seal member and a second seal member connected by a housing and configured to sealingly engage a conduit. Once these seal members seal/substantially fluidly isolate an inspection portion of the conduit, a couplant is introduced to the inspection portion via a couplant feed system. An inspection device located between the first seal member and the second seal member may ultrasonically inspect the conduit through the couplant. In-situ inspection of conduits with these systems provides a comprehensive, accurate and quick test of conduits and associated joints without the need for significant disassembly and/or fluid consumption and distribution, and may assist technicians during maintenance and assembly processes.

Figure 1:
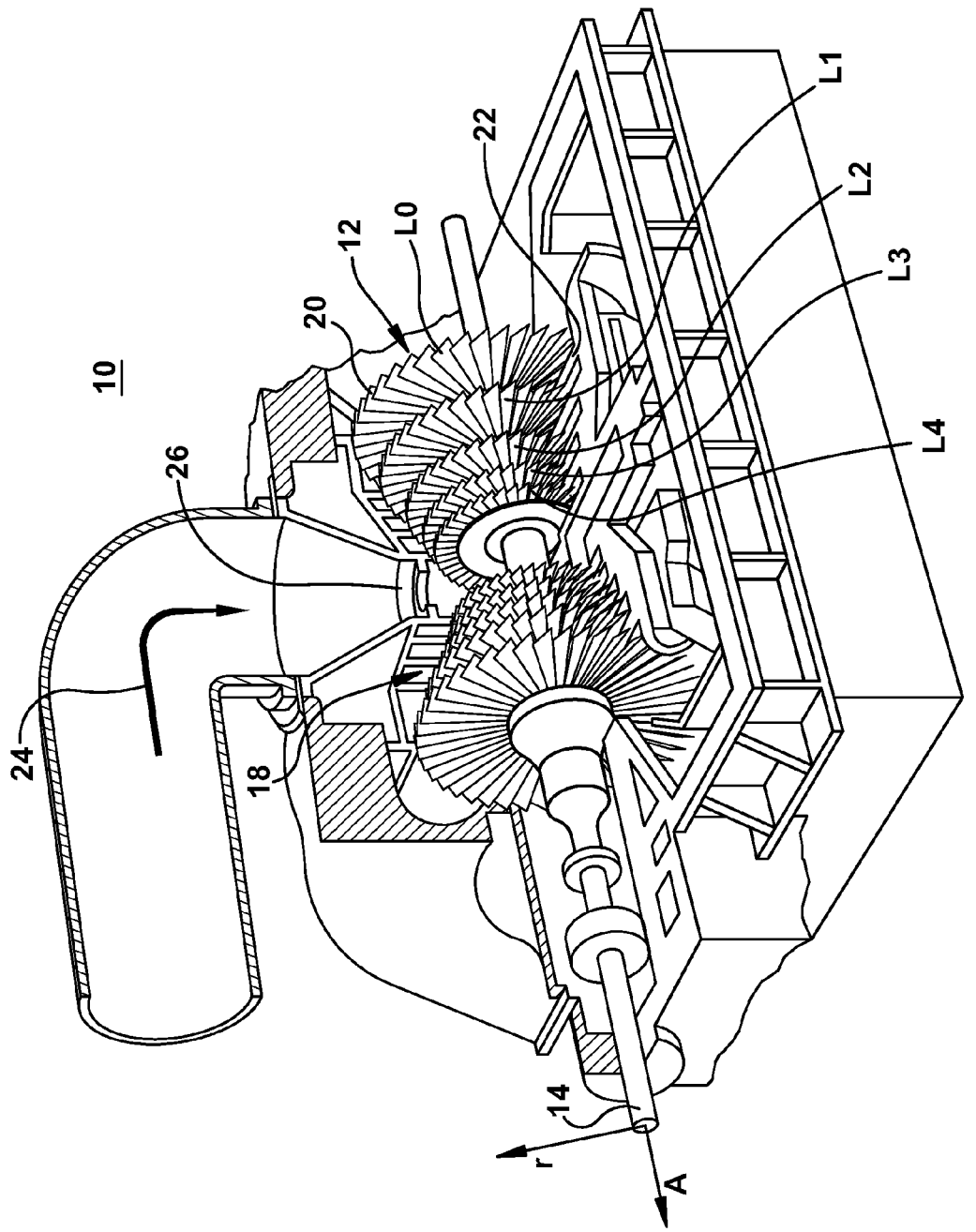
FIG. 1 shows a three-dimensional partial cut-away perspective view of a portion of a turbine.

Turning to the FIGURES, embodiments of systems, devices, and methods for immersive in-situ inspection of machine components are shown, where the systems may increase efficiency and safety in machine inspection processes, by quickly and accurately identifying defects in machine components. Each of the components in the FIGURES may be connected via conventional means, e.g., via a common conduit or other known means as is indicated in FIGS. 1-8. Referring to the drawings, FIG. 1 shows a perspective partial cut-away illustration of a gas or steam turbine 10. Turbine 10 includes a rotor 12 that includes a rotating shaft 14 and a plurality of axially spaced rotor wheels 18. A plurality of rotating blades 20 are mechanically coupled to each rotor wheel 18. More specifically, blades 20 are arranged in rows that extend circumferentially around each rotor wheel 18. A plurality of stationary vanes 22 extend circumferentially around shaft 14, and the vanes are axially positioned between adjacent rows of blades 20. Stationary vanes 22 cooperate with blades 20 to form a stage and to define a portion of a steam flow path through turbine 10.

In operation, gas or steam 24 enters an inlet 26 of turbine 10 and is channeled through stationary vanes 22. Vanes 22 direct gas or steam 24 downstream against blades 20. Gas or steam 24 passes through the remaining stages imparting a force on blades 20 causing shaft 14 to rotate. At least one end of turbine 10 may extend axially away from rotating shaft 12 and may be attached to a load or machinery (not shown) such as, but not limited to, a generator, and/or another turbine.

In one embodiment, turbine 10 may include five stages. The five stages are referred to as L0, L1, L2, L3 and L4. Stage L4 is the first stage and is the smallest (in a radial direction) of the five stages. Stage L3 is the second stage and is the next stage in an axial direction. Stage L2 is the third stage and is shown in the middle of the five stages. Stage L1 is the fourth and next-to-last stage. Stage L0 is the last stage and is the largest (in a radial direction). It is to be understood that five stages are shown as one example only, and each turbine may have more or less than five stages. Also, as will be described herein, the teachings of the invention do not require a multiple stage turbine.

As used herein, the terms "axial" and/or "axially" refer to the relative position/direction of objects along axis A, which is substantially parallel to the axis of rotation of the turbomachine (in particular, the rotor section). As further used herein, the terms "radial" and/or "radially" refer to the relative position/direction of objects along axis (r), which is substantially perpendicular with respect to axis A and intersects axis A at only one location. Additionally, the terms "circumferential" and/or "circumferentially" refer to the relative position/direction of objects along a circumference which surrounds axis A but does not intersect the axis A at any location.

Figure 2:
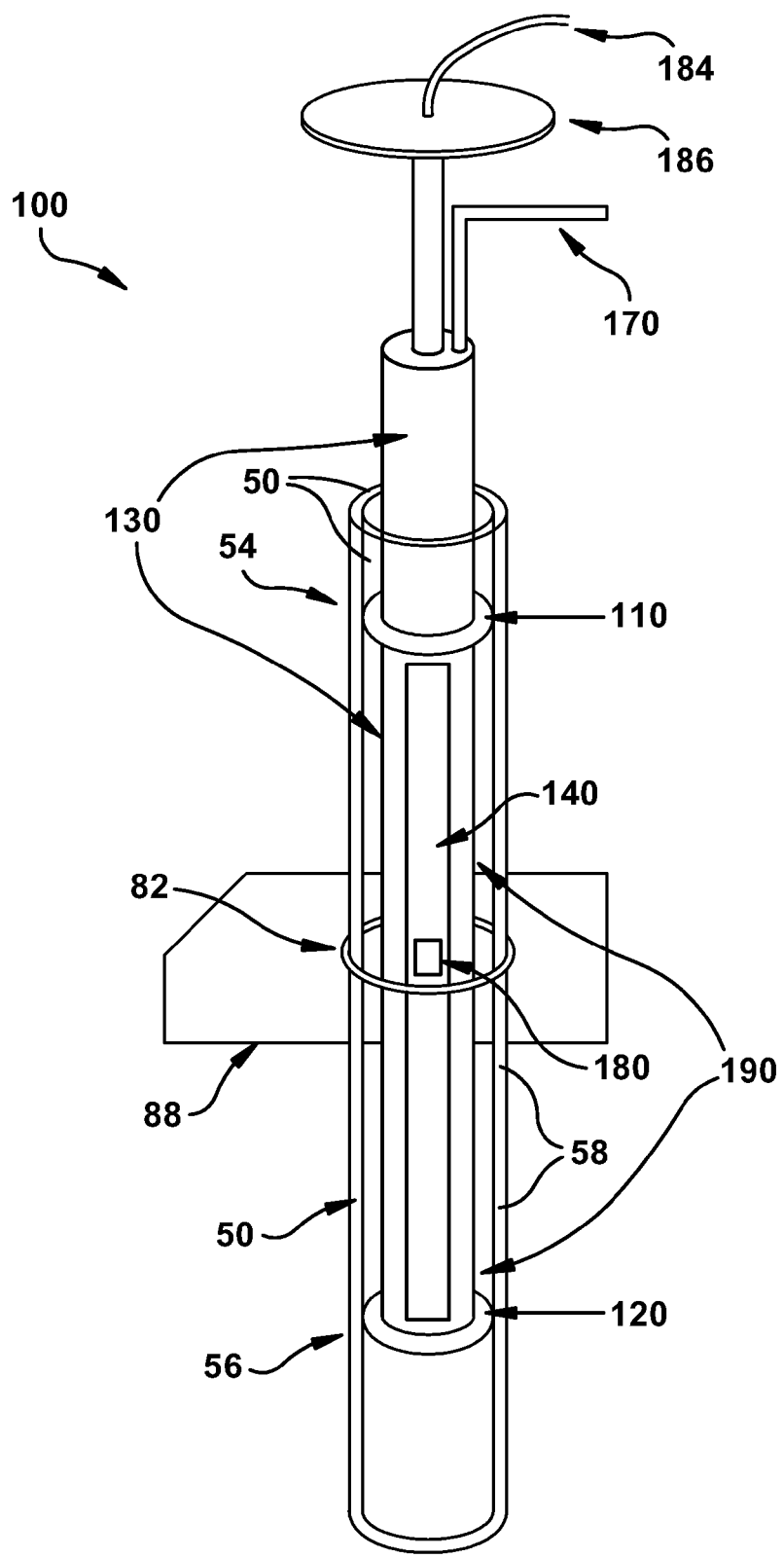
FIG. 2 shows a schematic view of an embodiment of a system in accordance with an aspect of the invention.
Figure 3:
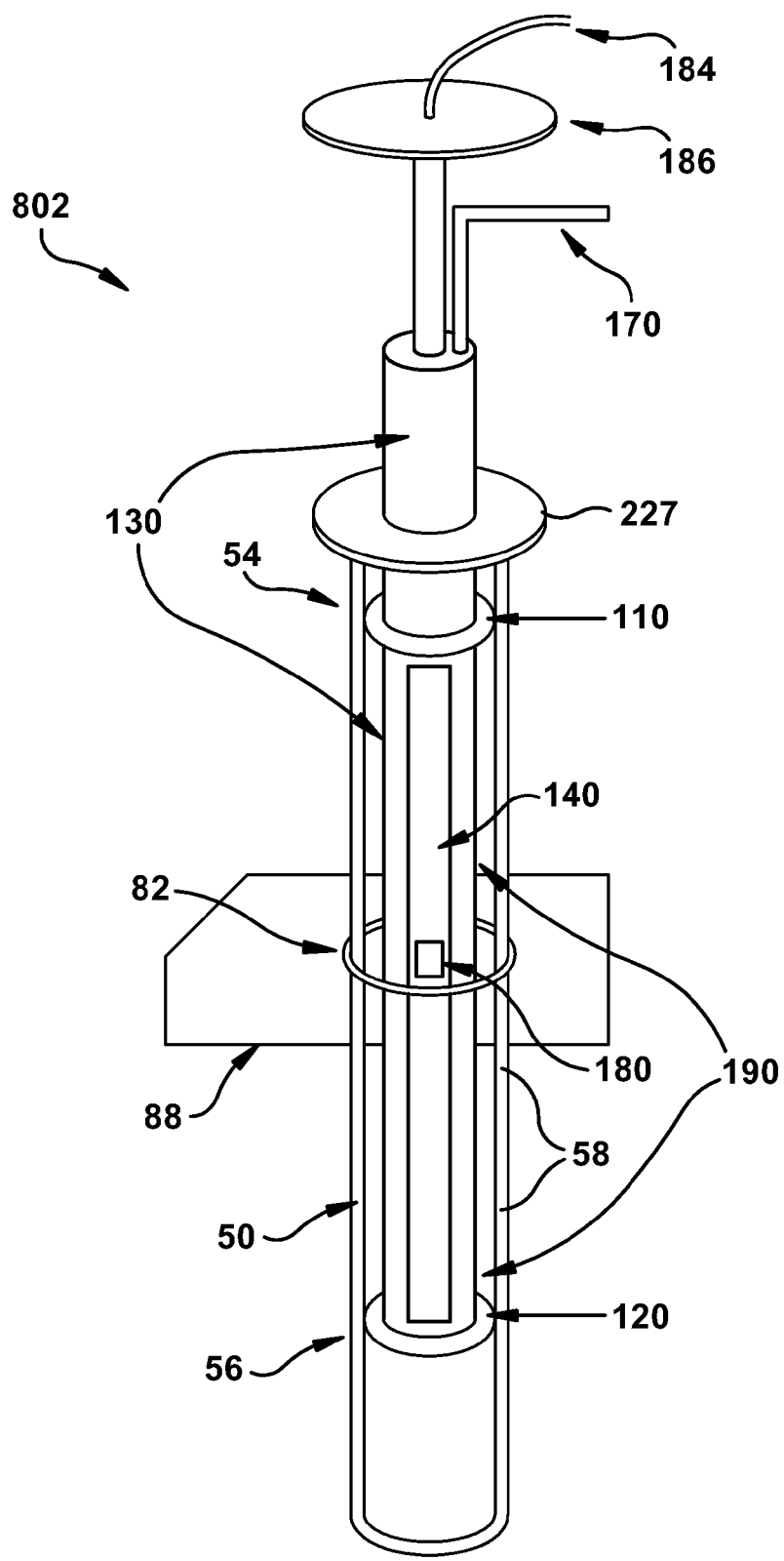
FIG. 3 shows a schematic view of an embodiment of a system in accordance with an aspect of the invention.

Turning to FIG. 2, a schematic illustration of a system 100 disposed within a conduit 50 is shown in accordance with aspects of the invention. System 100 may include a first seal member 110 (e.g., an adjustable gasket, a balloon, etc.) sealingly connected to a first portion 54 of conduit 50, and a second seal member 120 (e.g., an adjustable gasket, a balloon, etc.) sealingly connected to a second portion 56 of conduit 50. First seal member 110 and second seal member 120 may define an inspection portion 190 (e.g., a portion of conduit 50 between first seal member 110 and second seal member 120) and be connected to one another via a base system 130 which is configured to test/inspect portions of conduit 50. Base system 130 may include a housing 140 configured to extend substantially within conduit 50 and between first seal member 110 and second seal member 120. An inspection device 180 (e.g., an ultrasonic probe, an acoustic transducer, a sonar probe, a scanning probe, etc.) may be connected to housing 140 and configured to access conduit 50. In an embodiment, first seal member 110 and second seal member 120 may substantially fluidly seal inspection portion 190 of conduit 50. A couplant system 170 (e.g., a couplant feed system, a couplant evacuation system, etc.) may supply a couplant (e.g., a coupling medium, fluid, water, oil, etc.) to inspection portion 190 of conduit 50. The couplant may substantially fill/flood inspection portion 190 and act as a medium for testing/inspection by inspection device 180 (e.g., a medium for sound to travel from inspection device 180 to inner surface 58, a bond, etc.). In an embodiment, the couplant may be substantially stagnant (e.g., non-turbulent) in inspection portion 190. It is understood that system 100 and other embodiments described herein, may be operated/inspect components manually, automatically, or as a combination thereof.

In an embodiment, during an in-situ testing/inspection process (e.g., machine component inspection in a power plant system), inspection device 180 may be initially oriented/located within conduit 50 by at least one of first seal member 110 and second seal member 120, and communicatively connected to a computing device (shown in FIG. 6) 510 (e.g., via a set of coaxial leads 184). First seal member 110 and/or second seal member 120 may substantially center inspection device 180 within conduit 50 relative an axis of rotation of inspection device 180 (e.g., centered at a position relative an interior surface 58 of conduit 50, etc.). In an embodiment, first seal member 110 and/or second seal member 120 may rigidly locate inspection device 180 at a center of rotation within conduit 50, this location reducing (e.g., minimizing) time of flight difference for circumferential readings by inspection device 180.

In one embodiment, inspection device 180 may be positioned and/or manipulated within inspection portion 190 and/or housing 140 via an inspection device handle 186. Inspection device 180 may be slid between first seal member 110 and second seal member 120 and/or may be rotated within conduit 50. In one embodiment, inspection device 180 may be positioned proximate a joint 82 between conduit 50 and a tube sheet 88. A technician and/or computing device 510, may adjust a lateral position of inspection device 180 within conduit 50, adjustment may be based on readings obtained from inspection device 180. During adjustment, inspection device 180 may be activated and monitored via computing device 510, in this manner inspection device 180 may be located substantially proximate joint 82 and then locked in position in preparation for rotation/circumferential scanning. In an embodiment, inspection portion 190 may be filled with couplant prior to alignment of inspection device 180 with joint 82, thereby enabling inspection device 180 to ultrasonically detect and/or indicate a location of joint 82. Inspection device 180 may be adjustable and/or rotatable within housing 140 so as to enable 360 degree inspection/testing of joint 82. In one embodiment, housing 140 may include an inspection device window through housing 140 configured to allow direct contact (e.g., through the couplant) between inspection device 180 and an interior surface 58 of conduit 50. In one embodiment, inspection device 180 may ultrasonically inspect a circumference of conduit 50 for defects (e.g., joining defects, discontinuities, etc.) via the couplant as inspection device 180 is rotated within conduit 50. In one embodiment, housing 140 may rotate with inspection device 180 about conduit 50. In another embodiment, inspection device 180 may rotate substantially independent of housing 140. A technician and/or computing device 510 (shown in FIG. 6) may obtain a data set 532 representative of a quality of conduit 50 and/or joint 82 by monitoring readings of inspection device 180. Data set 532 may substantially represent inspection results of conduit 50 and/or joint 58 which may be processed by computing device 510. In one embodiment, system 100 may process data set 532 with computing device 510 for analysis as described herein. Inspection device 180 and computing device 510 may be connected via wireless, wireline, optical fiber cable, radio frequency or any other medium known.

In an embodiment of the present invention, couplant feed system 170 may supply couplant to inspection portion 190 between first sealing member 110 and second sealing member 120 and may also evacuate couplant therefrom. In one embodiment, first seal member 110 and second seal member 120 may substantially fluidly/sealingly engage with interior surface 58 of conduit 50. In an embodiment, at least one of first seal member 110 and/or second seal member 120 may include an inflatable seal (e.g., a balloon) configured to expand to contact and seal with interior surface 58. In another embodiment, at least one of first seal member 110 and second seal member 120 may include a gasket configured to mechanically connect to and disconnect from conduit 50. The gasket may be connected to a seal device which is configured to adjust a shape of the gasket, the seal device configured to expand the gasket to sealingly engage conduit 50 and to contract the gasket to disengage from conduit 50. In an embodiment, the seal device may be operable in a first direction to expel the gasket outward (e.g., increase gasket circumference), and the seal device may be operable in a second direction to draw the gasket inward (e.g., decrease gasket circumference). In one embodiment, the seal device may be controlled via at least one of a manual control system, a pneumatic control system, or a hydraulic control system.

In an embodiment of the present invention, inspection device 180 may be configured to be disposed within and/or inspect a conduit 50 with a diameter of about 0.3 centimeters to about 0.9 centimeters. In one embodiment, inspection device 180 may include a transducer and/or a mirror disposed proximate conduit wall/interior surface 58, and may be configured to detect defects of about 0.1 centimeters to about 0.5 centimeters. In one embodiment, shown in FIG. 3, a system 802 may include a cap component 227 which is configured to connect (e.g., sealingly connect) to the end of conduit 50 and through which base system 130 may extend. Cap component 227 may substantially seal inspection portion 190 for retention of the couplant and/or in-situ inspection. In an embodiment, cap component 227 may conform and/or adhere to an end of conduit 50 to form a third seal member 227. In one embodiment, cap component 227 may replace first sealing member 110.

Figure 4:
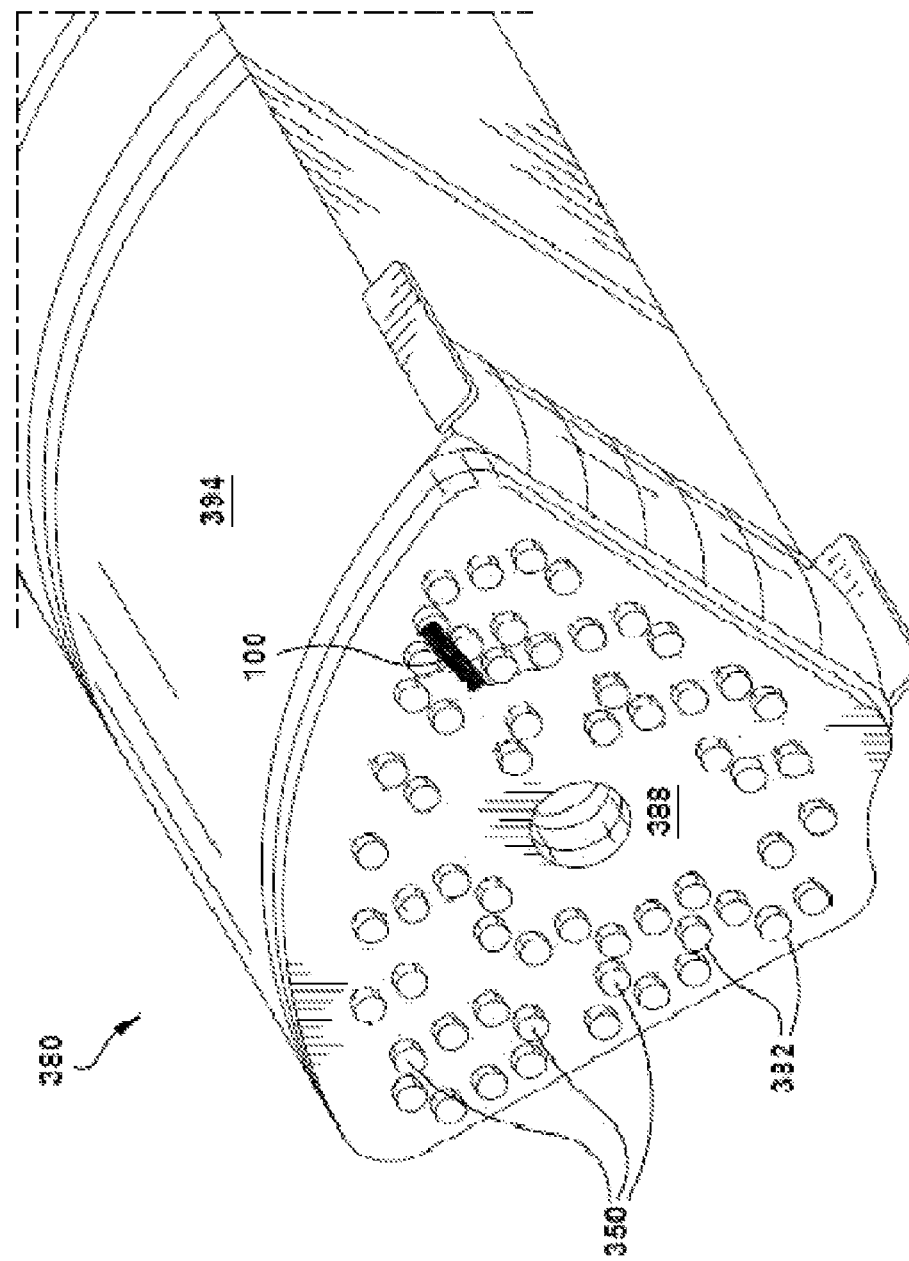
FIG. 4 shows a schematic view of an embodiment of a system connected to a machine component in accordance with an aspect of the invention.

Turning to FIG. 4, in this embodiment, a machine component 380 (e.g., a nozzle, a gas turbine nozzle, a rotor, a blade, a bucket, etc.) may include a plurality of conduits 350 disposed in an array within a conduit sheet 388. Plurality of conduits 350 may extend within machine component 380 and be substantially enclosed by a casing 394. Conduit sheet 388 may be connected to plurality of conduits 350 via a set of joints 382 (e.g., welds, brazes, etc.). In an embodiment, system 100 of FIG. 2 may be connected to a conduit 350 for inspection of joint 382 and or conduit 350. System 100 may be systematically disposed within each of plurality of conduits 350 by a technician and/or computing device 510 for inspection/testing of the array. It is understood that the illustrated array of machine component 380 is merely exemplary, and that any number of and/or arrangement of conduits now known or later developed may be inspected and/or analyzed by system 100.

Figure 5:
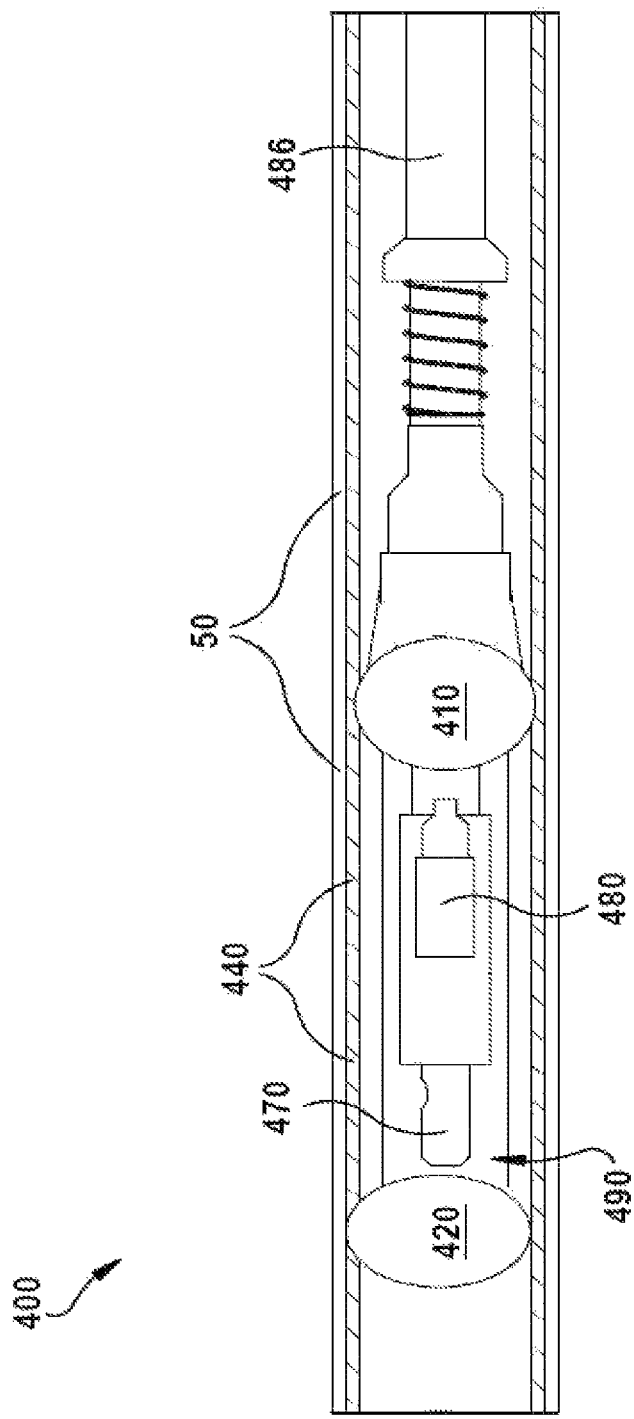
FIG. 5 shows a cut-away view of an embodiment of a system in accordance with an aspect of the invention.

Turning to FIG. 5, a schematic illustration of an immersion inspection system 400 disposed within conduit 50 is shown in accordance with aspects of the invention. System 400 may include a first seal member 410 (e.g., an adjustable gasket, a balloon, etc.) sealingly connected to conduit 50, and a second seal member 420 (e.g., an adjustable gasket, a balloon, etc.) sealingly connected to conduit 50. First seal member 410 and second seal member 420 may sealingly define an inspection portion 490 of conduit 50 between one another, thereby allowing inspection portion 490 to be substantially filled/flooded by a couplant supplied by a couplant feed system 470. First seal member 410 and second seal member 420 contact conduit 50 to create a sealed section/chamber (inspection portion 490) in which couplant may be introduced and maintained at a substantially static state during inspection. System 400 may be manipulated about and/or within conduit 50 by computing device 510 (shown in FIG. 6) via a handle 486. In operation, system 400 may be located within conduit 50 and engaged with interior surface 58 (shown in FIG. 2) of conduit 50 via first seal member 410, second seal member 420, and/or a housing 440. Once couplant fills inspection portion 490, computing device 510 may activate an inspection device 480 (e.g., an ultrasonic probe, an acoustic transducer, a sonar probe, a scanning probe, etc.) and locate inspection device 480 laterally between first seal member 410 and second seal member 420. Once located, computing device 510 may circumferentially scan conduit 50 via inspection device 480. In one embodiment, inspection device 480 may ultrasonically scan conduit 50 via the couplant.

Figure 6:
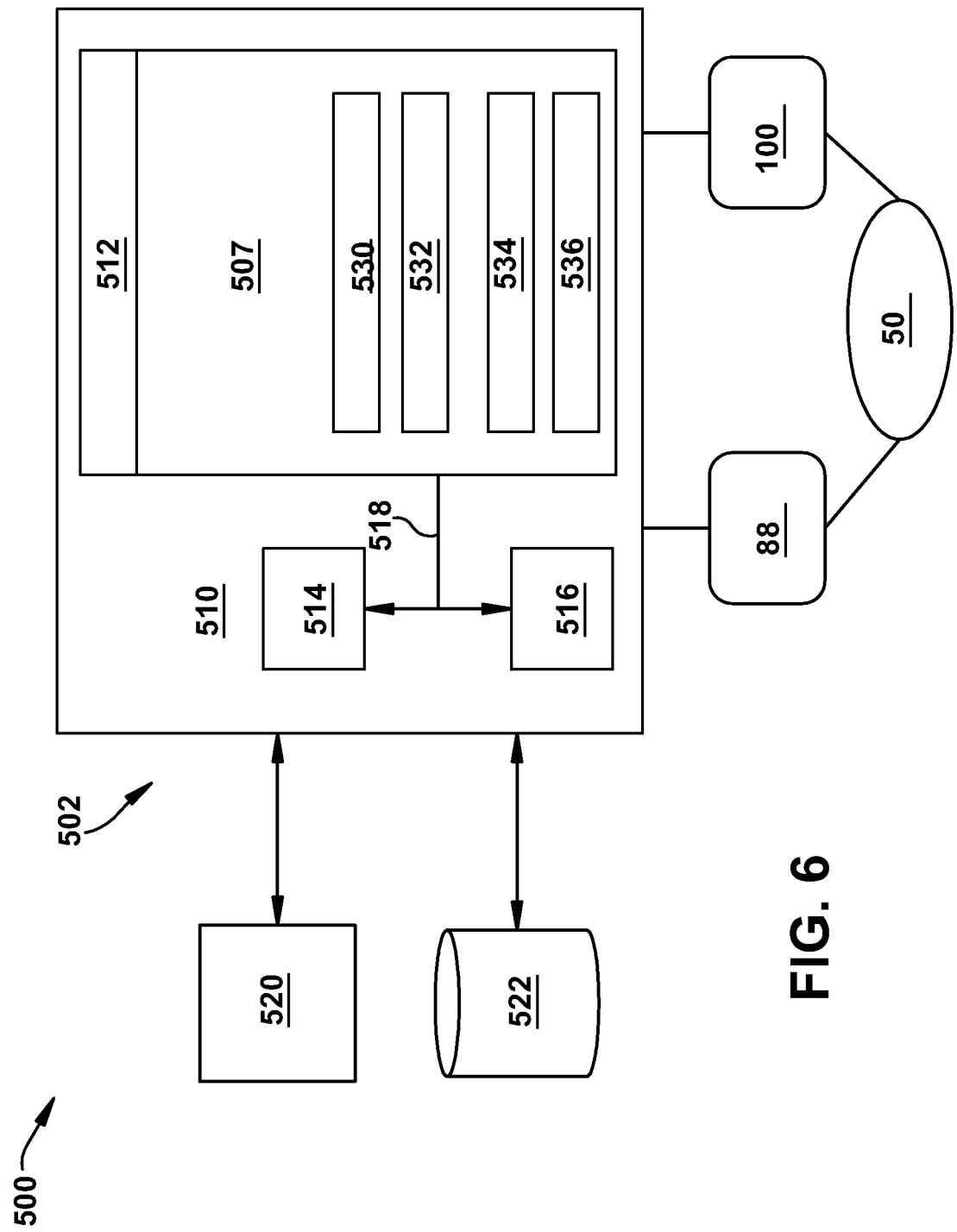
FIG. 6 shows a schematic illustration of an environment including a control system in accordance with an embodiment of the invention.

Turning to FIG. 6, an illustrative environment 500 including an immersive inspection control system 507 is shown according to embodiments of the invention. Environment 500 includes a computer infrastructure 502 that can perform the various processes described herein. In particular, computer infrastructure 502 is shown including computing device 510 which includes immersive inspection control system 507, which enables computing device 510 to analyze portions of machine conduit 50 (e.g., joints, surfaces, conduits, etc.) by performing the process steps of the disclosure. In one embodiment, computing device 510 may determine a quality of joints 82, 282, a conduit 50, and/or detect defects therein. Inspection control system 507 may be operated manually by a technician, automatically by computing device 510, and/or in conjunction with a technician and computing device 510.

As previously mentioned and discussed further below, immersive inspection control system 507 has the technical effect of enabling computing device 510 to perform, among other things, the immersive testing and inspection analysis described herein. It is understood that some of the various components shown in FIG. 6 can be implemented independently, combined, and/or stored in memory for one or more separate computing devices that are included in computing device 510. Further, it is understood that some of the components and/or functionality may not be implemented, or additional schemas and/or functionality may be included as part of immersive inspection control system 507.

Computing device 510 is shown including a memory 512, a processor unit (PU) 514, an input/output (I/O) interface 516, and a bus 518. Further, computing device 510 is shown in communication with an external I/O device/resource 520 and a storage system 522. As is known in the art, in general, PU 514 executes computer program code, such as immersive inspection control system 507, that is stored in memory 512 and/or storage system 522. While executing computer program code, PU 514 can read and/or write data, such as graphical user interface 530 and/or operational data 534, to/from memory 512, storage system 522, and/or I/O interface 516. Bus 518 provides a communications link between each of the components in computing device 510. I/O device 520 can comprise any device that enables a user to interact with computing device 510 or any device that enables computing device 510 to communicate with one or more other computing devices. Input/output devices (including but not limited to keyboards, displays, pointing devices, etc.) can be coupled to the system either directly or through intervening I/O controllers.

In some embodiments, as shown in FIG. 6, environment 500 may optionally include system 100 connected to conduit 50 and communicatively connected to computing device 510 (e.g., via wireless or hard-wired means), and conduit 50 connected to conduit array 88 via a joint 82. Inspection device 180 of system 100 may scan/analyze/inspect joint 82 (e.g., ultrasonically) and transmit data set 532 to computing device 150 for analysis. In an embodiment, computing device 510 may be configured to perform and automated inspection of at least one of conduit 50 and/or plurality of conduits 350 (shown in FIG. 4).

In any event, computing device 510 can comprise any general purpose computing article of manufacture capable of executing computer program code installed by a user (e.g., a personal computer, server, handheld device, etc.). However, it is understood that computing device 510 is only representative of various possible equivalent computing devices and/or technicians that may perform the various process steps of the disclosure. To this extent, in other embodiments, computing device 510 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. In one embodiment, computing device 510 may be/include a distributed control system.

Figure 7:
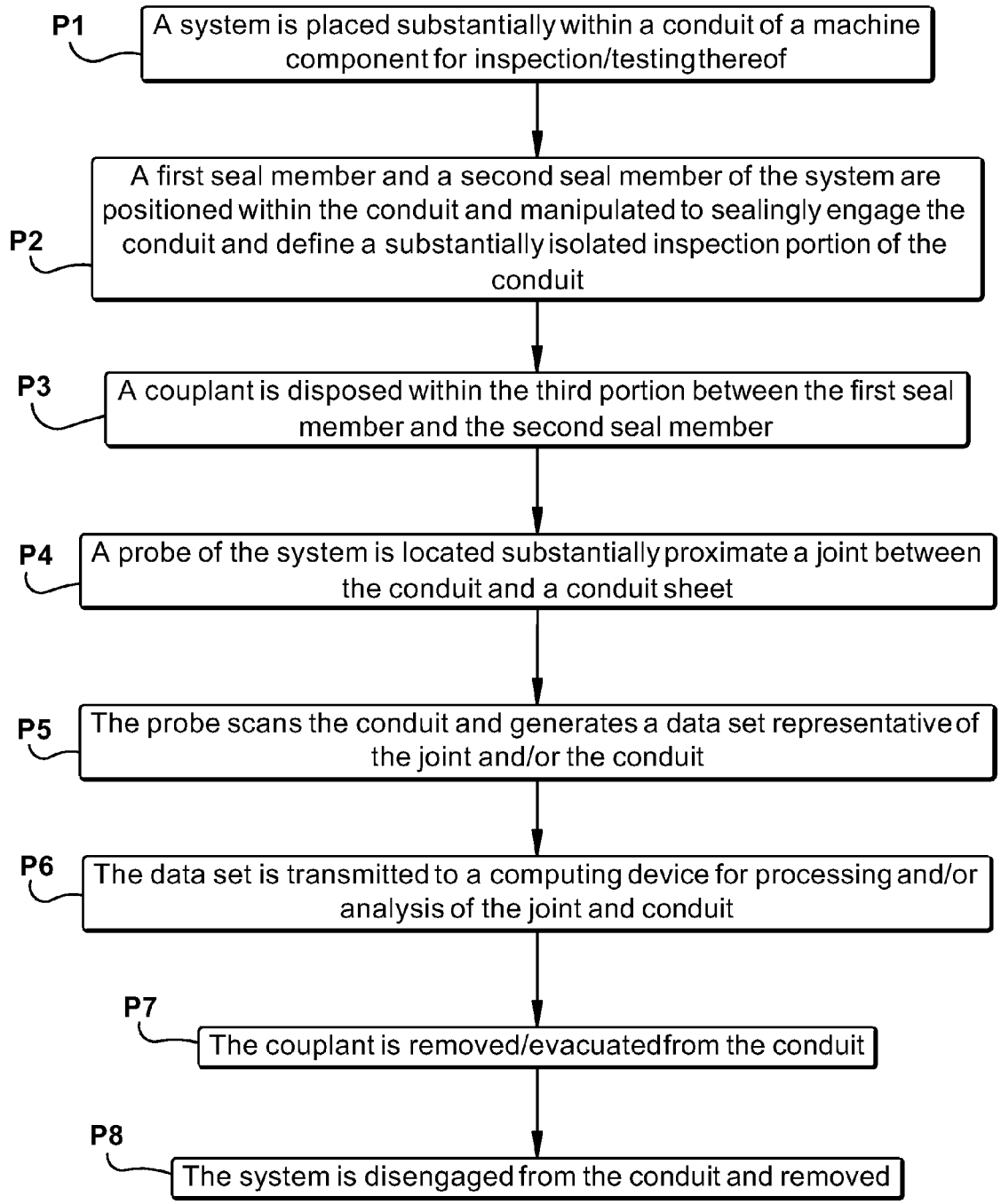
FIG. 7 shows a method flow diagram illustrating a process according to embodiments of the invention.

Turning to FIG. 7, an illustrative method flow diagram is shown according to embodiments of the invention: In process P1, system 100 is placed in conduit 50 for inspection/testing by inspection device 180. In an embodiment, housing 140 may be slid within conduit 50 in preparation for inspection. Following process P1, in process P2, a technician and/or computing device 510 positions first seal member 110 and second seal member 120 within conduit 50 and sealingly engages conduit 50. In an embodiment, both first seal member 110 and second seal member 120 form a substantially fluid seal with inner surface 58 of conduit 50 substantially fluidly isolating inspection portion 190 of conduit 50. In one embodiment, sealing engagement of at least one of first seal member 110 and second seal member 120 centers inspection device 180 within conduit 50 (e.g., centrally locates inspection device 180 within conduit 50, disposes inspection device 180 at a substantially common circumferential distance relative inner surface 58, etc.). Following process P2, in process P3, the technician and/or computing device 510 substantially fills inspection portion 190 with a couplant (e.g., fluid, liquid, water, oil, etc.). In one embodiment, the couplant may be supplied via couplant feed system 170. Following process P3, in process P4, the technician, computing device 510 and/or PU 514 may locate inspection device 180 proximate joint 82. In an embodiment, inspection device 82 may begin emitting an ultrasonic pulse/frequency/signal which may be monitored via computing device 510. The technician and/or computing device 510 may monitor the ultrasonic signal in order to locate inspection device 180 proximate joint 82.

Following process P4, in process P5, the technician, computing device 510 and/or PU 514 activates inspection device 180 to generate data set 532 and/or to circumferentially scan a circumference of conduit 50. In one embodiment, inspection device 180 may rotate about conduit 50 proximate joint 82 during scanning based on commands received from the technician and/or computing device 510.

Following process P5, in process P6, data set 532 is transmitted to computing device 510 for analysis/processing to determine/detect defects and/or faults within joint 82 and or conduit 50. Following process P6, in process P7, the couplant is removed from conduit 50 (e.g., evacuated, drained, etc.). In an embodiment, couplant feed system 170 may evacuate the couplant from inspection portion 190 of conduit 50. Following process P7, in process P8, system 100 is disengaged from conduit 50 and removed. In an embodiment, first seal member 110 and second seal member 120 may disengage from conduit 50.

Figure 8:
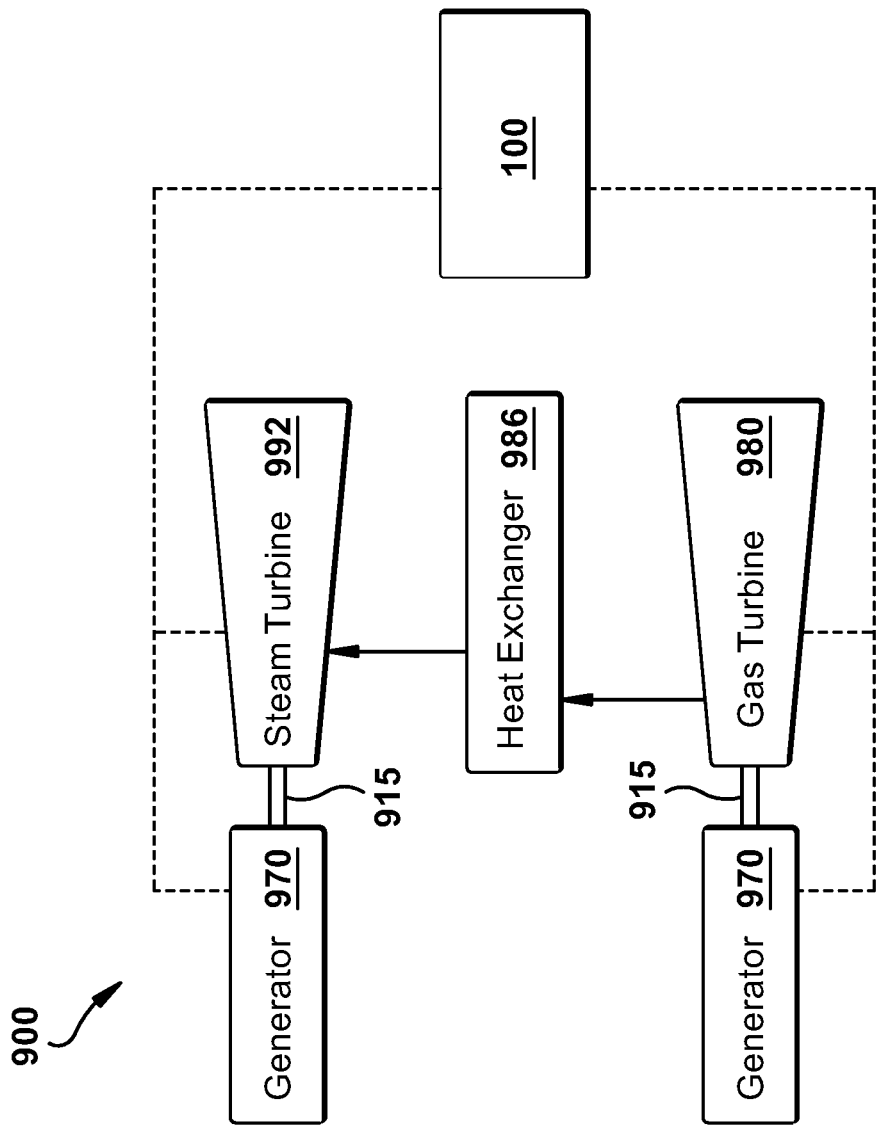
FIG. 8 shows a schematic view of an embodiment of portions of a multi-shaft combined cycle power plant in accordance with an aspect of the invention.
Figure 9:
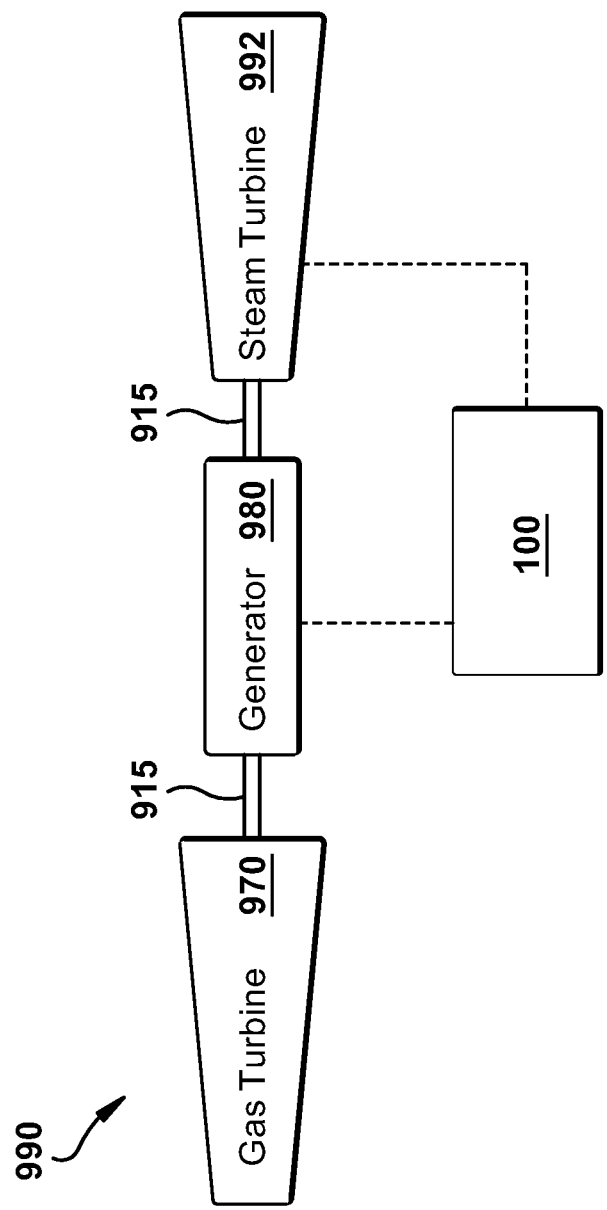
FIG. 9 shows a schematic view of an embodiment of a single shaft combined cycle power plant in accordance with an aspect of the invention.

Turning to FIG. 8, a schematic view of portions of a multi-shaft combined-cycle power plant 900 is shown. Combined-cycle power plant 900 may include, for example, a gas turbine 942 operably connected to a generator 944. Generator 944 and gas turbine 942 may be mechanically coupled by a shaft 911, which may transfer energy between a drive shaft (not shown) of gas turbine 942 and generator 944. Gas turbine 942 may be connected to system 100 of FIG. 2 or other embodiments described herein. Also shown in FIG. 8 is a heat exchanger 946 operably connected to gas turbine 942 and a steam turbine 948. Heat exchanger 946 may be fluidly connected to both gas turbine 942 and steam turbine 948 via conventional conduits (numbering omitted). Heat exchanger 946 may be a conventional heat recovery steam generator (HRSG), such as those used in conventional combined-cycle power systems. As is known in the art of power generation, HRSG 946 may use hot exhaust from gas turbine 942, combined with a water supply, to create steam which is fed to steam turbine 948. Steam turbine 948 may optionally be coupled to a second generator system 944 (via a second shaft 911). It is understood that generators 944 and shafts 911 may be of any size or type known in the art and may differ depending upon their application or the system to which they are connected. Common numbering of the generators and shafts is for clarity and does not necessarily suggest these generators or shafts are identical. Generator system 944 and second shaft 911 may operate substantially similarly to generator system 944 and shaft 911 described above. Steam turbine 948 may be connected to system 100 of FIG. 1 or other embodiments described herein. In one embodiment of the present invention (shown in phantom), system 100 may be used to inspect components in either or both of steam turbine 948 and gas turbine 942. In another embodiment, two systems 100 may be operably connected to combined-cycle power plant 900, one system 100 for each of gas turbine 942 and steam turbine 946. In another embodiment, shown in FIG. 9, a single-shaft combined-cycle power plant 990 may include a single generator 944 coupled to both gas turbine 942 and steam turbine 946 via a single shaft 911. Gas turbine 942 and steam turbine 946 may be connected to system 100 of FIG. 2 or other embodiments described herein.

The data flow diagram and block diagrams in the FIGURES illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The system of the present disclosure is not limited to any one particular machine, driven machine, turbine, fan, blower, compressor, power generation system or other system, and may be used with other power generation systems and/or systems (e.g., combined-cycle, simple-cycle, nuclear reactor, etc.). Additionally, the system of the present invention may be used with other systems not described herein that may benefit from the inspection, testing, and evaluative capabilities of the system described herein.

As will be appreciated by one skilled in the art, the system described herein may be embodied as a system(s), method(s), operator display (s) or computer program product(s), e.g., as part of a power plant system, a power generation system, a turbine system, etc. Accordingly, embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module," "network" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
   a first seal member configured to sealingly engage a first portion of a machine component;
   a base system connected to the first seal member and configured to extend within the machine component, the base system including:
      a housing; and
      an inspection device disposed within the housing and configured to inspect the machine component; and
   a second seal member connected to the base system and configured to sealingly engage a second portion of the machine component,
   wherein the inspection device is configured to slide relative to the first seal member and the second seal member to inspect the machine component.

2. The system of claim 1, further comprising a couplant feed system connected to the housing, the couplant feed system configured to introduce couplant between the first seal member and the second seal member.

3. The system of claim 2, wherein the couplant feed system is further configured to evacuate couplant between the first seal member and the second seal member.

4. The system of claim 1, wherein at least one of the first seal member and the second seal member are configured to sealingly engage an interior surface of the machine component.

5. The system of claim 1, further comprising a computing device communicatively connected to the inspection device and configured to process a data set obtained by the inspection device.

6. The system of claim 1, wherein at least one of the first seal member and the second seal member are configured to orient the inspection device relative to an interior surface of the machine component.

7. The system of claim 1, wherein at least one of the first seal member and the second seal member include:
   a gasket configured to mechanically connect to and disconnect from the machine component; and
   a seal device configured to adjust a shape of the gasket, the seal device configured to expand the gasket to sealingly engage the machine component and to contract the gasket to disengage from the machine component.

8. The system of claim 7, wherein the seal device is controlled via at least one of: a manual control system, a pneumatic control system, or a hydraulic control system.

9. An inspection system comprising:
   a first seal member configured to sealingly engage a first portion of a machine component;
   a second seal member disposed proximate the first seal member and configured to sealingly engage a second portion of the machine component, the first seal member and the second seal member substantially fluidly isolating an inspection portion of the machine component;
   a housing connected to the first seal member and configured to extend within the inspection portion of the machine component; and
   a couplant feed system connected to the housing and configured to inject couplant into the inspection portion of the machine component;
   an inspection device disposed within the housing and configured to inspect the machine component,
   wherein the inspection device is configured to slide relative to the first seal member and the second seal member to inspect the machine component.

10. The system of claim 9, wherein the couplant feed system is further configured to evacuate couplant between the first seal member and the second seal member.

11. The system of claim 9, wherein at least one of the first seal member and the second seal member are configured to sealingly engage an interior surface of the machine component.

12. The system of claim 9, wherein at least one of the first seal member and the second seal member are configured to orient an inspection device within the inspection portion relative to an interior surface of the machine component.

13. The system of claim 9, wherein at least one of the first seal member and the second seal member include:
   a gasket configured to mechanically connect to and disconnect from the machine component; and
   a seal device configured to adjust a shape of the gasket, the seal device configured to expand the gasket to sealingly engage the machine component and to contract the gasket to disengage from the machine component.

14. The system of claim 13, wherein the seal device is controlled via at least one of: a manual control system, a pneumatic control system, or a hydraulic control system.

* * * * *